Feb. 6, 1940.    R. F. MACFARLANE ET AL    2,189,214
ICING OF OR THE APPLICATION OF CREAM OR THE LIKE TO BISCUITS
Filed Dec. 8, 1937    2 Sheets-Sheet 1
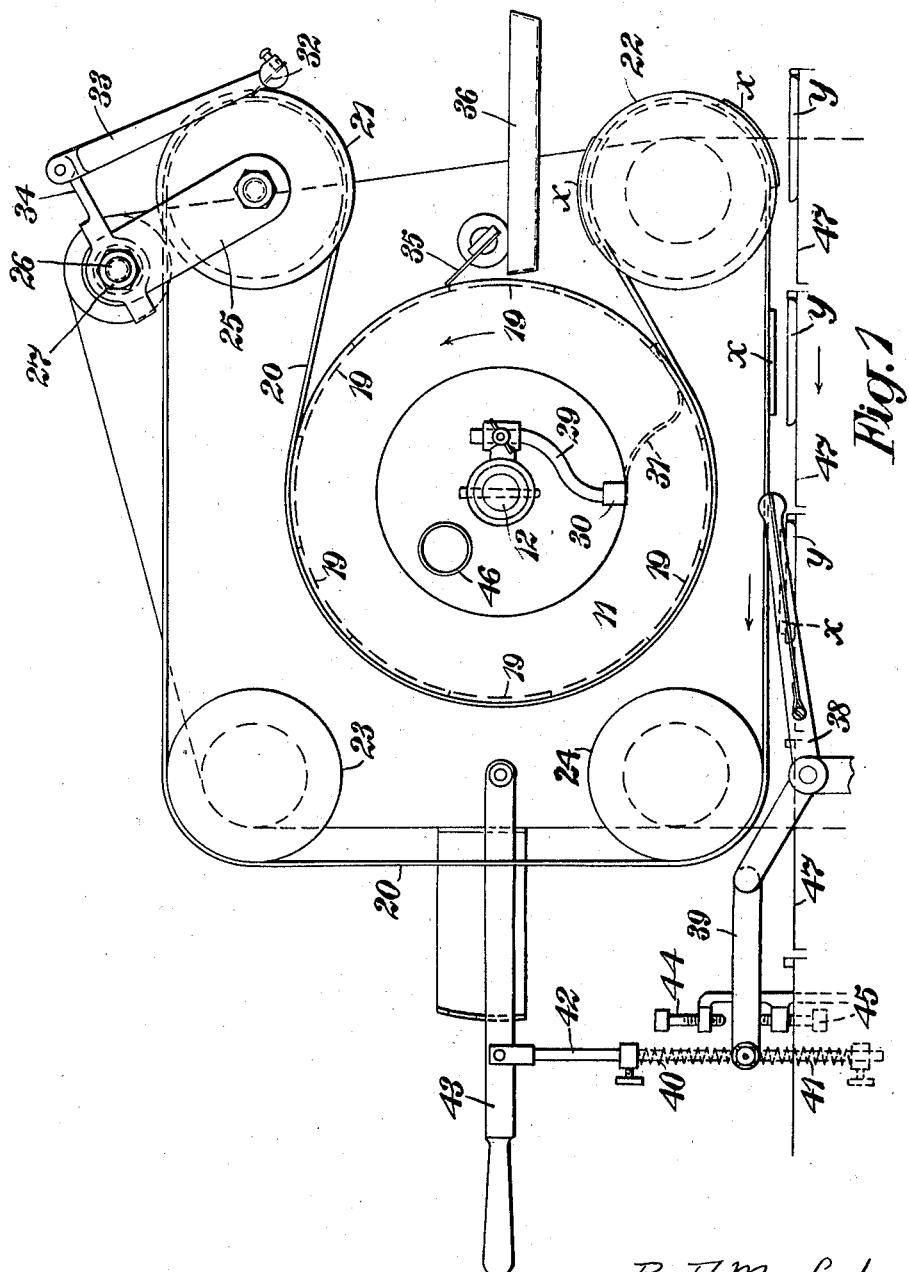
R. F. Macfarlane
W. E. Prescott
INVENTORS.
By George B. Willcox
Attys.

Feb. 6, 1940. R. F. MACFARLANE ET AL 2,189,214
ICING OF OR THE APPLICATION OF CREAM OR THE LIKE TO BISCUITS
Filed Dec. 8, 1937 2 Sheets-Sheet 2
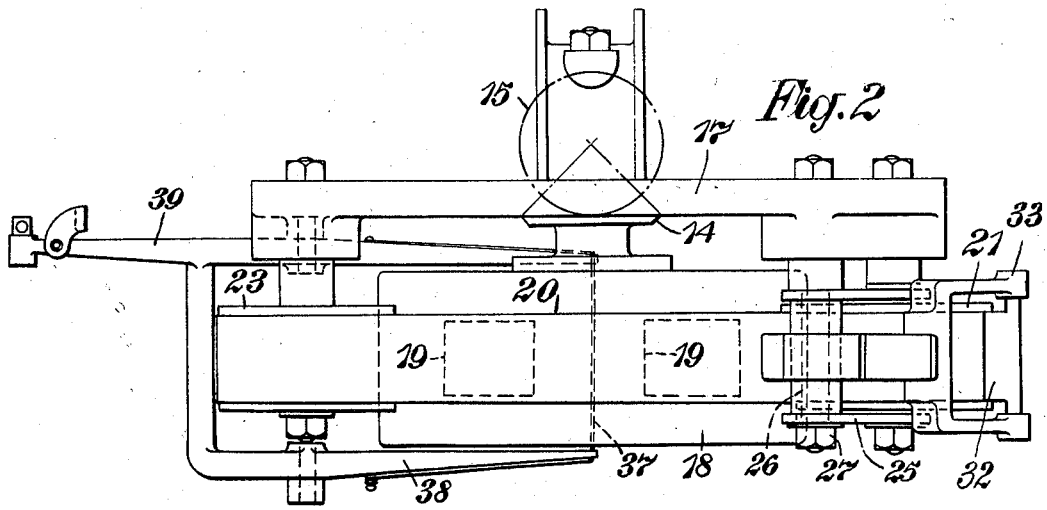
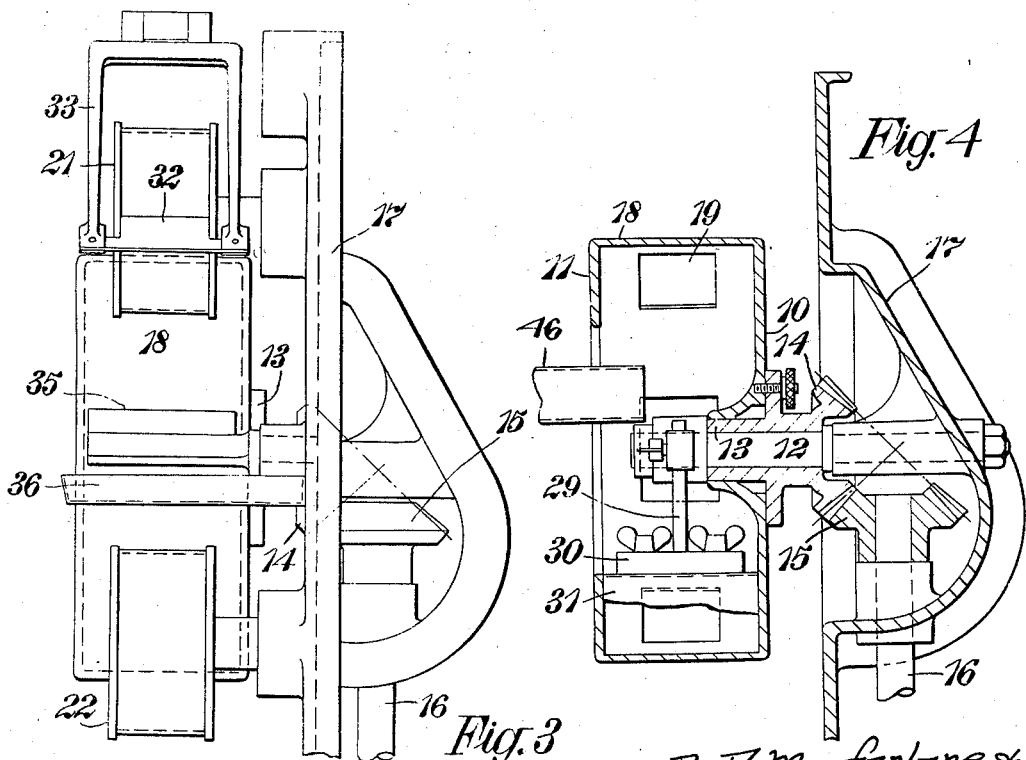

Patented Feb. 6, 1940

2,189,214

UNITED STATES PATENT OFFICE 2,189,214

ICING OF OR THE APPLICATION OF CREAM OR THE LIKE TO BISCUITS

Robert French Macfarlane, Osterley, and William Edward Prescott, Peterborough, England Application December 8, 1937, Serial No. 178,796
In Great Britain December 10, 1936

1 Claim. (Cl. 91—2)

This invention relates to the icing of, or the application of cream or the like to, biscuits, of the character in which the biscuits are provided with a layer or stencil of cream or the like, or wherein the cream is sandwiched between two biscuits, and an object of the invention is to provide an improved type of machine in which the layer of cream or the like has imparted thereto the desired shape and is automatically applied to or laid upon the biscuits in a reliable manner.

The invention consists in a machine for applying layers of cream or the like to biscuits comprising a rotatable cylinder or drum having a peripheral series of stencil apertures adapted to be filled with cream delivered into the drum through an end thereof, a travelling band or web lapped against the exterior surface of the drum to receive layers of cream from the apertures and convey them to a depositing position for deposit upon travelling biscuits.

The invention also consists in a machine for applying layers of cream or the like to biscuits comprising a rotatable cylinder or drum having a peripheral series of stencil apertures adapted to be filled with cream delivered into the drum through an end thereof, and a travelling band or web having a lap engaging the lower part of the drum to form a closure for the apertures as they reach their lower position and to receive layers of cream from the apertures for deposit upon travelling biscuits.

The invention further consists in a machine for applying cream or the like to biscuits comprising a cylinder or drum mounted to rotate upon a horizontal axis and having a peripheral series of stencil apertures adapted to be filled with cream delivered into the drum through an end thereof, an endless travelling band or web a lap of which engages the exterior surface of the cylinder to receive layers of cream from the apertures and convey them to a depositing position where they are transferred to travelling biscuits.

The travelling layer receiving surface may comprise an endless band having a drum-engaging lap extending around a substantial portion of the drum surface.

The return lap of the band may comprise a part located beneath the drum and moving in a rectilinear path, the cream layers being stripped from such part for deposit upon the biscuits travelling beneath said part.

The travelling layer receiving surface may comprise a band or web of paper or other suitable material drawn from a spool.

Further features of the invention will be hereinafter described and defined in the claims.

In the accompanying diagrammatic drawings:

Figure 1 is a front elevation of a machine according to the invention.

Figure 2 is a corresponding plan.

Figure 3 is an end elevation, while

Figure 4 is a sectional elevation.

In carrying the invention into effect according to one convenient mode, a drum or cylinder is 10 mounted for rotation upon a horizontal axis. One end 10 of the drum is closed while the other end is open at the central portion but is provided with an inwardly directed flange 11.

The drum is supported by the end wall 10 upon a fixed stub shaft 12 by means of a sleeve member 13 which is formed integrally with a bevel wheel 14 meshing with a bevel wheel 15 fixed upon a driving shaft 16.

The stub shaft 12 and the main shaft 16 are carried in a framework 17.

The cylindrical surface 18 of the drum is provided with a peripheral series of stencil apertures 19. These apertures are adapted to be covered by an enclosing band element 20, the width of the band being somewhat greater than the width of the apertures. The endless band element 20 passes around a pair of jockey or guide rolls 21, 22 which are located to one side of the drum and are spaced apart vertically so that a portion of the cylindrical surface is left exposed. The non-engaging portion or return lap of the endless band passes around two further jockey rolls 23, 24 which are located on the opposite side of the drum. At the lower part the return lap of the band passes through a rectilinear path extending between lower jockey rolls 22 and 24, such rectilinear path preferably being located in a horizontal plane.

The endless band 20 may be formed of any suitable material such as thin steel, or it may be of any other flexible material such as rawhide, Pegamoid, patent leather or the like having a suitable surface adapted to receive the cream layers, and from which they may be stripped.

The jockey rolls 21 and 22 are flanged to provide lateral positioning means for the band so that it is retained in its correct position on the drum relatively to the stencil apertures 19.

The jockey roll 21 is mounted upon a lever or arm 25 which is pivoted upon a stub shaft 26 whereby it is adjustable for the purpose of tightening the band, the lever being retained in its adjusted position by a nut 27.

The jockey rolls 22, 23 and 24 are mounted to rotate upon stub shafts carried by the framework 17.

Located within the drum upon a bracket 28 fixed upon the stub shaft 12 is an arm 29 carrying a bar 30 to which a scraper or strickling device 31 is secured. The scraper engages the inner surface of the drum and extends fully across the drum and engages the wall 10 and the flange 11. The scraping edge of the strickler engages the surface of the drum adjacent the point where the endless band 20 leaves the drum and passes around the lower jockey roll 22.

A cleaning device is mounted in association with the endless band where it passes around the upper jockey roll 21 and such may comprise a blade 32 carried by a yoke piece 33 which is pivoted upon an arm 34 associated with the mounting for the jockey roll 21. Another scraper 35 is mounted to engage the outer cylindrical surface of the drum where the drum is exposed between the upper and lower jockeys 21 and 22. These cleaning or scraping devices are for the purpose of keeping the surfaces of the drum and band in a clean condition and any cream that may be removed therefrom is deposited in a tray 36 located below the scrapers.

Associated with the lower surface of the rectilinear portion of the endless band between the jockey rolls 22 and 24 is a cut-off device comprising a transverse wire 37 which is carried by a pivotally mounted yoke piece 38 having an arm 39 the end of which lies between a pair of springs 40, 41 on a control rod 42. The springs are adapted to be adjusted to obtain the desired resilient pressure of the wire against the band 20. The control rod 42 is coupled to a lever arm 43 by which the wire 37 may be moved to and from the operative position. The lever arm 39 moves between adjustable stops 44, 45 which limit the movement of the wire 37 in either direction. The mounting for the wire may be such that the wire may be adjusted longitudinally of the band and thus adjust the point at which the layers of cream are stripped from the band.

Cream, or other material which is to be supplied to the biscuits, is delivered from a suitable hopper or supply into the drum by means of a pipe 46 projecting through the central side opening.

The machine is mounted above a suitable travelling device upon which the biscuits are carried so that they travel parallel to the rectilinear lap of the band, the speed of travel of the biscuits and the band 20 being synchronised.

In operation, the drum is rotated and by it the endless band 20 is caused to travel, by its frictional engagement with the drum, in the direction of the arrow, Figure 1, so that the band will leave the drum adjacent the jockey roll 22 and then return on the lower rectilinear lap in a direction opposite to the direction of rotation of the drum. The cream located in the bottom of the drum is adapted to be spread across the drum so that it will fill the stencil apertures as they pass beneath the cream. Further movement of the drum brings the apertures (filled with cream) to the strickler device where the excess cream is strickled off so that the layer of cream in the stencil apertures will contain the correct thickness.

As the band separates from the drum adjacent the lower jockey roll 22 the layers or stencils of cream $x$ will adhere thereto and thus be drawn out of the stencil apertures of the drum. The band by its travel will convey the layers over the lower jockey roll 22 and along the return lap of the band so that they reach an inverted position. While passing through the rectilinear lap of the band the wire cut-off 37 strips the layers from the band and deposits them on the travelling biscuits $y$.

The drum may be angularly adjustable relatively to the sleeve 13 or the biscuit conveyor may be advanced or retarded in order to adjust the stencil aperture 19 to the biscuits.

The biscuits may be conveyed on travelling platform devices 47 adapted to be raised to receive the layers of cream, or the path through which the biscuits travel may be appropriately adjacent the path of the conveyor band so that vertical movement of the biscuits is unnecessary.

When it is desired to apply layers of a different shape or size, the drum is removed from the sleeve member 13 and another drum having the appropriate size and shape of aperture substituted.

Instead of depending upon the friction between the band 20 and the drum, a positive drive may be imparted to the band from the drum or other means synchronised therewith. Moreover the belt may be driven and impart rotation to the drum either through friction or positively.

According to a modification the upper jockey rolls 21 and 23 may be dispensed with and the band be supported by two rolls such as 22 and 24 in which case the layer receiving lap of the band will only engage the lower part of the drum.

According to a further arrangement, instead of receiving the cream layers upon an endless band, they may be received from the cylinder or drum upon a travelling paper or similar web which is drawn from a spool or supply. The spool is mounted in a position and a guide roll is provided such that the paper web is lapped against the lower peripheral surface of the drum. The web passes over the guide roll and along a rectilinear path in contact with a suitable guiding plate where the layers of cream are stripped by means of a wire cut-off. The travel of the web may be effected by pairs of feed rolls arranged adjacent the edges of the web, or a draw off spiral may be provided for the purpose.

We claim:

A machine for applying layers of cream or the like to biscuits, comprising a drum mounted to rotate about a horizontal axis, said drum having a peripheral series of stencil apertures, means for delivering cream into the drum through an end thereof to flow into said apertures, a scraper engaging the inner wall of said drum and operative to remove excessive cream from said apertures, an endless travelling band, supporting and guiding means therefor arranged to hold a lap thereon in engagement with a substantial arcuate extent of the lower exterior surface of the drum constituting with said drum a hopper for the cream, said band operative also to close said apertures to receive stenciled layers of cream therefrom, and convey said layers to a position where they are transferred to travelling biscuits.

ROBERT FRENCH MACFARLANE.
WILLIAM EDWARD PRESCOTT.